Figure 4:
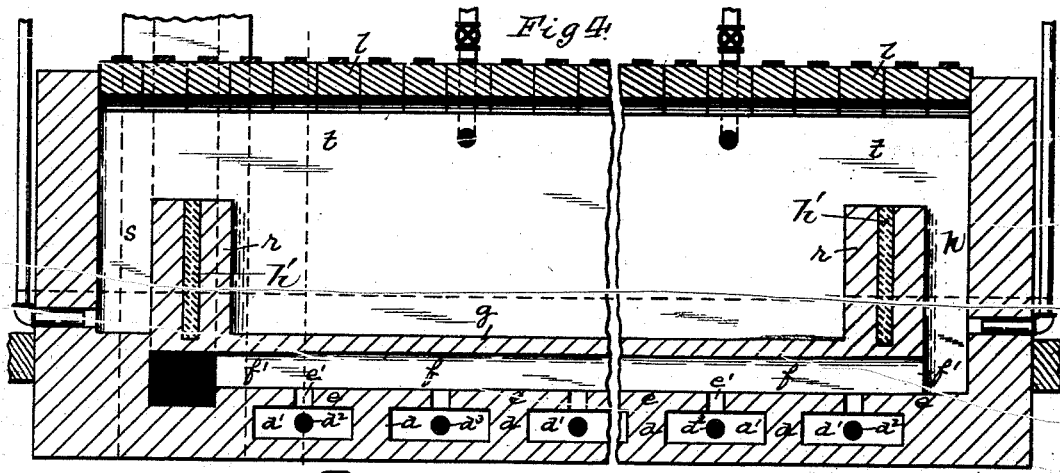

(No Model.) 2 Sheets—Sheet 1.
J. PEDDER.
FURNACE FOR TREATING STEEL.
No. 483,577. Patented Oct. 4, 1892.
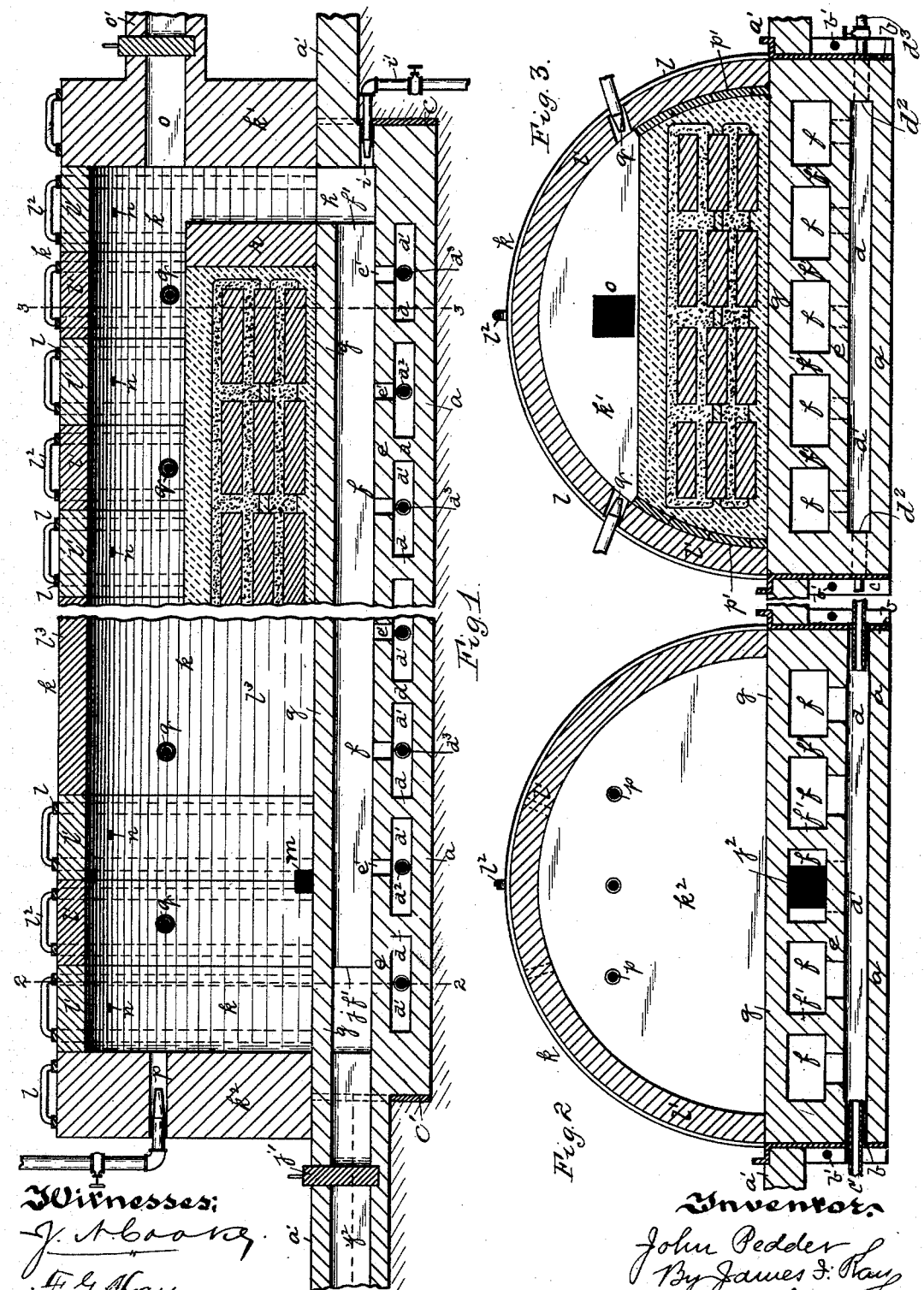
Witnesses:
J. N. Cooke
F. G. Kay
Inventor:
John Pedder
By James F. Kay
Attorney (No Model.) 2 Sheets—Sheet 2.

J. PEDDER.
FURNACE FOR TREATING STEEL.

No. 483,577. Patented Oct. 4, 1892.

Witnesses:
Inventor:
John Pedder
By James F. Kay
Attorney

UNITED STATES PATENT OFFICE.

JOHN PEDDER, OF PITTSBURG, PENNSYLVANIA.

FURNACE FOR TREATING STEEL.

SPECIFICATION forming part of Letters Patent No. 483,577, dated October 4, 1892.

Application filed March 15, 1890. Serial No. 343,973. (No model.)

*To all whom it may concern:*

Be it known that I, JOHN PEDDER, a resident of Pittsburg, in the county of Allegheny and State of Pennsylvania, have invented a new and useful Improvement in Furnaces for Treating Steel; and I do hereby declare the following to be a full, clear, and exact description thereof.

My invention relates to furnaces for converting or cementing iron or steel, these furnaces being employed to convert iron into steel or soft steel into hard steel, or for decarburizing steel by heating the same when protected from the atmosphere and in contact with charcoal or other carbonizing material or in contact with hammer-scale or other decarbonizing material. This class of furnaces has had practically but one construction, known as the "old cementation-furnace," such furnaces generally containing two pots and having a grate under the same, with flues extending under the pots and up the sides and ends thereof, the two pots being covered with an arched roof having chimneys leading therefrom. These pots, even though carefully built and cemented over, have always been found to open at different points and permit the entrance of air to the metal contained therein, it being found impossible to prevent the entrance of the air, since the heat was applied principally through the bottom, side, and end walls, and in case of any opening in the pot-walls the air could flow through these into the pot and act to spoil the metal by furnishing oxygen to burn the carbon and oxidize the metal or, as it is termed in the trade, " air the metal."

In the use of these furnaces it has been found necessary to gradually heat them up and maintain them at a particular temperature for a period of about six to eight days and after this treatment of the metal to permit the gradual cooling of the pot, this requiring about the same time before the pot was cool enough to permit the workmen to enter the furnace between the pot and the arched roof and uncover the metal in the pot and withdraw it therefrom, so that from twelve to fifteen days were required to obtain a single charge from the cementation-furnace.

The object of my invention is to overcome these difficulties in furnaces for converting or cementing iron or steel, first, in reducing the time necessary for treating the metal, so as to largely increase the output of the furnace, and, second, in preventing the entrance of air to the hearth and the destruction of the metal thereby.

To these ends I construct my improved furnace with a hearth to receive the metal to be treated, a fire-entrance at one end of and communicating directly with the space above the metal on the hearth, and a flue leading from the opposite end of the furnace. I also provide the furnace with a removable arch-roof supported on the hearth of the furnace. I also carry the flue leading from the end of the furnace downwardly and under the furnace to the opposite or forward end of the same, so as to apply the heat to the under surface of the hearth. I also improve the construction of the furnace in other particulars.

To enable others skilled in the art to make and use my invention, I will describe the same more fully, referring to the accompanying drawings, in which—

Figure 1 is a longitudinal central section of the same. Fig. 2 is a cross-section on the line 2 2, Fig. 1. Fig. 3 is a cross-section on the line 3 3, Fig. 1; and Figs. 4, 5, 6, and 7 are sectional views of modified forms of furnaces embodying my invention.

Like letters and figures of reference indicate like parts in each of the views.

The furnace is constructed of any suitable length and width, the proportions shown in the drawings being found well adapted for the purpose, and the furnace being formed from twelve to forty feet in length, as desired.

In the construction of my improved furnace I first lay the floor or foundation $a$ preferably below the level of the surrounding floor $a'$ of the building in which the furnace is situated, said floor or foundation being constructed of brick or other suitable material. The sides $b$ and end walls $c$ $c'$ are composed of metal plates held together in any suitable manner and securely braced by the stay-rods $b'$. Upon the floor $a$ are erected the cross walls or partitions $d$ at regular intervals apart and forming the cross-flues $d'$ extending from one side wall to the other. Ports $d^2$ for the admission of gas into the flues $d'$ are arranged in the side walls $b$, each of said cross-flues being supplied with such ports $d^2$ at one or both ends, said ports being connected with gas-supply pipes $d^3$, controlled by suitable valves. Resting upon the cross-walls $d$ is the supplementary floor $e$, which forms a foundation for the hearth of the furnace, as will more fully appear. This supplementary floor $e$ is supplied with openings $e'$, leading from the several cross-flues $d'$ into the longitudinal flues $f$, formed by the longitudinal walls $f'$, erected upon the supplementary floor $e$. The walls $f'$ do not extend along the entire length of the floor $e$, but begin and end at a point just within the ends of said floor, in order to form the requisite end flues for the purpose more specifically hereinafter stated. The parts thus constructed serve to form what will be hereinafter termed the "underground longitudinal flues." Finally, supported by the longitudinal walls $f'$ is the hearth proper $g$, the construction hitherto described having been designed to bring the hearth $g$ up on a level, or thereabout, with the surrounding floor $a'$ of the building containing the furnace for convenience of operation. This hearth $g$ is preferably constructed of bricks or tile, and upon it are arranged the ingots or other bodies of metal to be treated.

As hereinbefore stated, in order to form the requisite flues for the successful operation of the furnace the longitudinal walls $f'$ do not extend the entire length of the floor $e$, and for the same reason the hearth $g$ terminates with the walls $f'$ at the rear end of said hearth, so forming the downtake-flue $h$, which opens communication between the furnace-chamber proper and the underground longitudinal flues.

To supply heat directly to the longitudinal flues $f$, openings $i$, with gas-supply pipes $i'$, controlled by suitable valves, leading to each of said flues $f$, are formed in the rear end wall $c$. These gas-entrances may be made either in the downtake-flue $h$ or opposite the longitudinal flue $f$, as desired, the result being practically the same.

The forward end wall $c'$ of the flue-chamber is provided with the escape-flue $j$, leading to the stack-flue $j^2$ and regulated by a suitable damper $j'$, said escape-flue being in direct communication with the longitudinal flues $f'$. The roof $k$ of the furnace is made removable and is supported on the surrounding mill-floor $a'$. The side walls $b$ of the flue-chamber may be constructed with an outwardly-extending flange upon their upper portions, upon which the several sections which comprise the roof $k$ may rest, so that the entire area of the hearth $g$ may be free to receive the ingots or other bodies of metal. I prefer to form the removable roof in sections, as shown in the drawings, these sections being composed of the bricks or tiles $l'$, held together by the cramps $l$, said cramps being provided with the handles $l^2$ for their adjustment to place or removal. These arched sections are formed of a sufficient height to give the desired height of the converting-furnace above the hearth, the arches thus forming the side walls and roof of the furnace and enabling me to arrange the hearth on the same level as the surrounding working floor, so that after the metal has been filled upon the hearth the removable arches can be lowered over the same and the necessary loam filled in at the sides, while the upper portions of the arches form the reverberatory chamber through which the flame passes. If desired, a portion of the arch inclosing the longitudinal chamber above the hearth can be made stationary, as shown at $l^3$, the removable arches giving access to the part of the furnace under the stationary arch. These arches extending above the hearth can be made of large width and length—for example, say eight to twelve feet in width and of any length desired, so as to provide a very large treating-furnace.

Tap-holes $m$ are formed at intervals in the bricks or tiles composing the arches $k$ for the insertion of test-bars to test the condition of the metal with which the furnace is charged during the progress of cementation. Openings $n$ are also formed at intervals in the upper part of the roof $k$ for the insertion of a rod or bar from time to time to ascertain the condition of the loam covering the charge within the furnace. The end sections of the roof $k$ have their outer ends closed to form the end walls $k'$ $k^2$ of the treating-chamber; but these end walls may be built up on the hearth $g$ at the ends thereof separate from the arched sections, if desired. In the rear end wall $k'$ is the escape-flue $o$, leading to the stack-flue $o'$ and controlled by a suitable valve, and where the rear end wall is removable this escape-flue may also be removable, while the forward end wall $k^2$ is provided with the gas-inlets $p$, with gas-supply pipes leading thereto controlled by suitable valves.

If desired, gas-supply pipes $q$ may enter the roof $k$ at intervals to provide for the further heating of the heating-chamber, said pipes being controlled by valves by which the temperature at the different points of the chamber is regulated.

My improved furnace has been constructed with reference to the employment of gaseous fuel, and for the purpose all the gas-inlets are supplied with suitable air-inlets for the thorough mixture of the gas before it arrives at the point of combustion. It will be understood, however, that within the terms "gas," "gas-entrance," "gas-flue," and like expressions I include any suitable fuel or fuel-ports or flues, whether for gaseous, liquid, or solid fuels, as may be found desirable in heating the furnace.

In employing my improved furnace for converting or cementing I arrange the blooms 1 or other bodies of metal to be treated upon the hearth $g$, as shown in Fig. 3, the treating material 2, whether for carburizing or decarburizing the contents of the furnace, being arranged with reference to said blooms according to the degree of carburization or decarburization desired in the finished plates rolled from them. The blooms or other bodies of metal to be treated having been arranged in the manner desired upon the hearth $g$, they are then completely covered by loam 3 or other suitable material for sealing the carburizing or decarburizing material and preventing the entrance of the air through the top or side of the furnace. To prevent the loam or treating material from falling into the downtake-flue $h$, a temporary wall $r$ is erected at the rear end of the hearth $g$. The hearth $g$ being on a level with the surrounding floor of the building, it is an easy matter to arrange the blooms and compact the loam tightly around the same to form an air-tight covering. The removable roof composed of the different sections is then adjusted to place, each arched section by means of the handle $l^2$ being brought to position to form the covering for the hearth $g$ and its contents, while the end sections, with their end walls, complete the inclosure or treating-furnace proper. The cracks or chinks between the several sections may be filled with mortar or like substance to retain the heat within the heating-chamber. During the process of cementation the loam by the action of the heat is reduced to a plastic mass which tends to adhere to the bricks of the roof-sections and upon cooling is very difficult to remove from said bricks without destroying them, making it necessary to renew the bricks at and near the end portions of said sections. To obviate this difficulty, I insert between the inner walls of the roof-sections and the body of loam covering the charge the split bricks $p'$ or other suitable material to a height equal to that of the loam, so that when the roof-sections are removed they will be free from the loam, which will adhere to the bricks $p'$ instead. The parts of my improved furnace having been arranged in the manner described, it is ready for the heating operation, which may be performed in two ways.

In the first mode of operation the valve controlling the escape-flue $o$ in the rear end wall $k'$ is opened, while the escape-flue $j$ in the forward end wall $c'$ of the flue-chamber is closed by the damper $j'$. The gas being turned on it is ignited at the inlets $p$ in the forward wall $k^2$ of the heating-chamber, sufficient air being admitted at the same time to form a thorough combustion of the gas. The escape-flue $o$ at the rear end being open creates a straight draft through the space between the body of loam covering the blooms and the roof $k$, so that the heated products of combustion are carried through this space, raising its temperature to a high heat. The heated products, passing through this space the entire length of the furnace, escape directly to the stack-flue $o'$ through the escape-flue $o$. If the combustion of the gas at the inlets $p$ does not furnish sufficient heat to raise the temperature of the heating-chamber to the required degree, more heat can be had by igniting the gas at the several openings $q$, leading into the heating-chamber at certain intervals, but if upon inserting a rod or bar through any one of the openings $n$ into contact with the loam it is found that said loam is becoming too soft and pasty, then the gas entering the chamber nearest that opening is turned lower to reduce the heat of the furnace at that point, for if the loam is allowed to reach too high a degree of heat it will melt and burn the metal for which it forms a covering and so destroy said metal for all practical purposes. In this manner a uniform heat can be maintained throughout the length of the heating-chamber.

The second mode of operating my improved furnace differs from that just described in one respect—namely, that instead of opening the escape-flue $o$ the escape-flue $j$ at the opposite end is opened, the result being that, instead of the heated products passing between the space formed by the body of loam and the roof $k$ directly to the stack $o'$, they are carried down the flue $h$ to the longitudinal flues $f$ and along said flues to the escape-flue $j$, and thence to the stack-flue $j^2$.

In order to increase the heat under the hearth $g$, the gas is ignited at the ports $d^2$, entering the cross-flues $d'$ in the underground flue-chamber, and the heated products will pass up through the openings $e'$ in the supplementary floor $e$ to the longitudinal flues $f$, thus serving to heat the bottom of the hearth $g$. The heat entering the flues $d'$ can be readily controlled by the valves in the gas-supply pipes $d^3$. Where the blooms being treated are to be carburized or decarburized on both faces, a higher degree of heat must be maintained in the underground flue-chamber, and for this purpose the longitudinal flues $f$ have the gas-inlets $i$ leading thereto, by which additional heat may be furnished to raise the temperature below the hearth $g$.

In Figs. 4, 5, 6, and 7 I have shown several modified forms of my improved furnace whose modes of operation are similar to that described above, but differing somewhat in construction.

Figure 6:
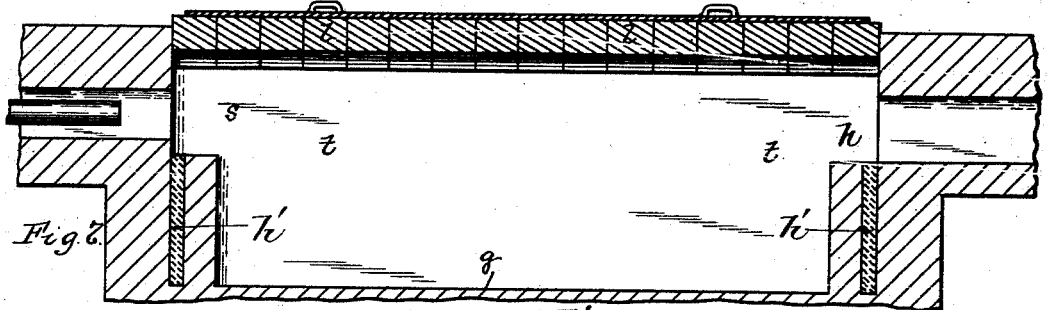
Figure 6:
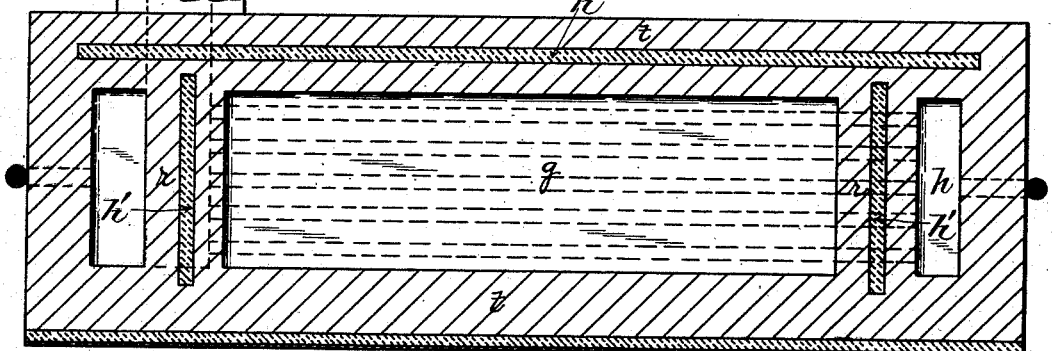
Figure 5:
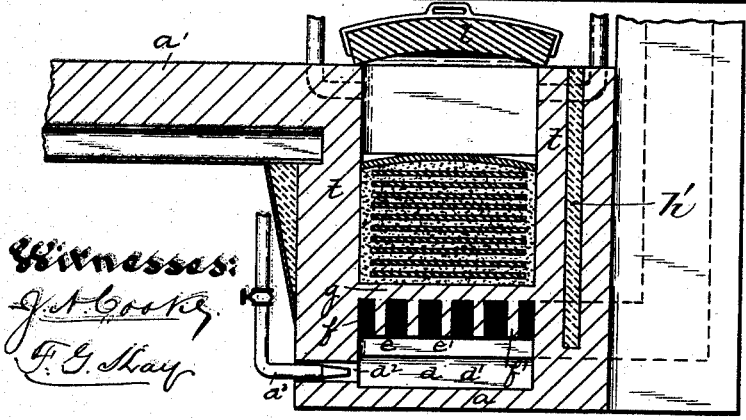

In Fig. 4 the hearth $g$ is constructed below the level of the surrounding floor $a'$, so forming a kind of pot having at each end the bridge-walls $r$. At the forward end of said furnace is the fire-chamber $s$, which in Figs. 4 and 6 is shown as a vertical chamber and in Fig. 7 as a horizontal fire-chamber. The hearth $g$ being below the level of the surrounding floor $a'$ makes it necessary to support the section $l$ upon the side walls $t$. A central filling $u$ of sand is inserted in the wall and end walls, as shown in said figures, otherwise the furnace is similar to that shown in Fig. 1, the different flues and gas-supply pipes being arranged in the same manner and denoted by the same letters of reference, while the mode of operation differs in no essential respect from that described above.

The form of furnace shown in Fig. 7 differs from that in Fig. 4, in that the fire-chamber is horizontal instead of vertical and is on a level with the body of loam covering the charge within the heating-chamber, so forming a direct passage for the products of combustion from the point of combustion to the escape-flue, the downtake-flue and the flues underneath the hearth being omitted in this form.

Practical experience has proven that the necessary heat for treating the metals can be generated very quickly and that the time required to treat the metals is about one-third of that required in the old forms of cementation-furnace. As soon as the metal has been properly treated, as ascertained by withdrawing the test-bars from time to time, the gas is shut off and the several sections composing the roof are removed. It is a very easy matter to remove the charge upon the hearth, especially where said hearth is on a level with the surrounding floor. By the removal of the roof and the exposure of the hearth and contents to the surrounding atmosphere the intense heat of the same is more speedily reduced to a temperature which will admit of drawing the charge.

What I claim as my invention, and desire to secure by Letters Patent, is—

1. A steel-cementation furnace having a furnace-chamber provided with a hearth to receive the metal, a fuel-entrance at one end thereof, a discharge-flue at the other end thereof, and having fuel-entrances above the metal on the hearth at intervals in the length of the furnace-chamber, said discharge-flue extending through the hearth below but close to the upper surface thereof and communicating with the chimney-flue at the forward end of the furnace, substantially as and for the purposes set forth.

2. A steel-cementation furnace having a hearth to receive the metal, a fuel-entrance at one end thereof and communicating with the space above the metal on the hearth, a downtake-flue leading from the opposite or rear end of the hearth, a flue leading therefrom and extending through the hearth and communicating with the chimney-flue at the forward end of the furnace, and a fuel-entrance at the rear of the furnace, communicating with the longitudinal flue extending through the hearth, substantially as and for the purposes set forth.

3. A steel-cementation furnace having a hearth to receive the metal, longitudinal flues extending from the hearth through the bottom wall of the hearth and communicating with the chimney, and cross-flues beneath said longitudinal flues and communicating therewith, said cross-flues having fuel-supply pipes leading thereto, substantially as and for the purposes set forth.

4. A steel-cementation furnace having a hearth to receive the metal, a fuel-entrance at the forward end thereof, a discharge-flue leading from the opposite end thereof, and removable arched sections forming both the side walls to confine the charge on the hearth and the roof of the fire-chamber, substantially as and for the purposes set forth.

5. A steel-cementation furnace having a furnace-chamber provided with a hearth to receive the metal, a fuel-entrance at one end thereof, a discharge-flue at the other end thereof, and having fuel-entrances above the metal on the hearth at intervals in the length of the furnace-chamber, substantially as and for the purposes set forth.

6. A steel-cementation furnace having a hearth to receive the metal, a fuel-entrance at one end thereof, a discharge-flue at the opposite end thereof, openings at intervals in the side wall at about the level of the hearth to receive test-bars, and gas-entrances above the metal on the hearth at intervals in the length of the furnace, substantially as and for the purposes set forth.

7. The herein-described method of operating steel-cementation furnaces, consisting in building up the charge on a flat hearth, inclosing the top and sides thereof with loam or like material, confining the sides of the charge by one or more arched sections extending over the hearth, and passing the heat and flame longitudinally over the loam covering and between it and the roof, substantially as and for the purposes set forth.

8. The herein-described method of operating steel-cementation furnaces, consisting in building up the charge on a flat hearth, inclosing the sides and top thereof with loam or like covering, confining the sides of the charge by one or more arched sections, with an interposed layer of tile between the loam covering and arched sections, and passing the heat and flame longitudinally over the loam covering between it and the roof formed by the arched section, substantially as and for the purposes set forth.

9. A steel-cementation furnace having a hearth to receive the metal, a fuel-entrance at the forward end thereof, a discharge-flue leading from the opposite end thereof, a stationary arch, and a removable arch-section fitting against the stationary arch to form the roof of the fire-chamber, substantially as and for the purposes set forth.

In testimony whereof I, the said JOHN PEDDER, have hereunto set my hand.

JOHN PEDDER.

Witnesses:
ROBT. D. TOTTEN,
J. N. COOKE.